(12) United States Patent
Candelario

(10) Patent No.: US 12,448,236 B2
(45) Date of Patent: *Oct. 21, 2025

(54) APPARATUS AND DEVICES FOR MOVING, TRANSPORTING, AND STORING PORCH BOTS

(71) Applicant: David M Candelario, James Island, SC (US)

(72) Inventor: David M Candelario, James Island, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/957,215

(22) Filed: Nov. 22, 2024

(65) Prior Publication Data
US 2025/0083909 A1    Mar. 13, 2025

Related U.S. Application Data

(63) Continuation-in-part of application No. 17/595,985, filed on Dec. 1, 2021.

(51) Int. Cl.
| | |
|---|---|
| *B65G 67/20* | (2006.01) |
| *B60P 1/44* | (2006.01) |
| *B60P 1/54* | (2006.01) |
| *B65G 67/02* | (2006.01) |

(Continued)

(52) U.S. Cl.
CPC ............ *B65G 67/20* (2013.01); *B60P 1/4414* (2013.01); *B60P 1/4421* (2013.01); *B60P 1/5438* (2013.01);

(Continued)

(58) Field of Classification Search
CPC ....... B65G 67/20; B65G 67/02; B60P 1/4414; B60P 1/4421; B60P 1/5438; B60P 1/5442;

(Continued)

(56) References Cited

U.S. PATENT DOCUMENTS

| | | | |
|---|---|---|---|
| 2,108,104 | A | 2/1938 | Cordrey |
| 3,485,321 | A | 12/1969 | Smith, Jr. |

(Continued)

FOREIGN PATENT DOCUMENTS

| | | |
|---|---|---|
| CN | 115571537 A | 1/2023 |
| EP | 3372541 A | 9/2018 |

*Primary Examiner* — Jacob S. Scott
*Assistant Examiner* — Erin Morris
(74) *Attorney, Agent, or Firm* — Carson Patents; Gregory D Carson

(57) ABSTRACT

The present invention provides an automated product transport and storage system designed to enhance efficiency, precision, and safety in logistics and delivery operations. The system includes automated bots, such as porch bots, railed fork bots, and railed crane bots, which perform tasks like loading, unloading, and positioning products within transport vehicles. These bots reduce the reliance on manual labor, mitigate the risk of injuries, and improve productivity by operating autonomously or semi-autonomously in confined or complex environments, such as urban and suburban delivery routes. The system is equipped with advanced control systems, GPS tracking, and obstacle detection, enabling precise navigation and real-time responsiveness. Versatile and adaptable, the system can be used across various industries, from food distribution to industrial supply chains, while reducing infrastructure requirements and contributing to energy efficiency. This invention represents a significant advancement in automated logistics and product handling.

19 Claims, 8 Drawing Sheets

(51) Int. Cl.
*B66F 5/00* (2006.01)
*B66F 7/00* (2006.01)
*B66F 9/00* (2006.01)
*B66F 9/06* (2006.01)
*B66F 9/07* (2006.01)

(52) U.S. Cl.
CPC ............ *B60P 1/5442* (2013.01); *B65G 67/02* (2013.01); *B66F 5/00* (2013.01); *B66F 7/00* (2013.01); *B66F 9/00* (2013.01); *B66F 9/06* (2013.01); *B66F 9/07* (2013.01); *G05B 2219/2641* (2013.01)

(58) Field of Classification Search
CPC ...... B66F 5/00; B66F 7/00; B66F 9/00; B66F 9/06; B66F 9/07; G05B 2219/2641
See application file for complete search history.

(56) References Cited

U.S. PATENT DOCUMENTS

| | | | |
|---|---|---|---|
| 4,199,170 A | | 4/1980 | Hubner et al. |
| 4,633,538 A | * | 1/1987 | James ..................... B66F 9/06 |
| | | | 187/244 |
| 5,195,726 A | | 3/1993 | Kaner |
| 5,381,940 A | | 1/1995 | Wright |
| 6,644,063 B2 | | 11/2003 | Mogil |
| 6,983,946 B2 | | 1/2006 | Sullivan et al. |
| 9,475,638 B2 | | 10/2016 | Cavalcante et al. |
| 10,118,632 B2 | | 11/2018 | Carzola |
| 11,560,079 B2 | | 1/2023 | Lundeen et al. |
| 11,829,136 B2 | | 11/2023 | Gil |
| 11,834,271 B2 | * | 12/2023 | Kalouche ................ B60P 3/007 |
| 2003/0206791 A1 | | 11/2003 | Wroblewski |
| 2005/0129490 A1 | * | 6/2005 | Hutchins ................ B60P 3/122 |
| | | | 414/462 |
| 2006/0045710 A1 | * | 3/2006 | Hiebert ..................... B66F 7/02 |
| | | | 414/631 |
| 2006/0182564 A1 | * | 8/2006 | Thiel ..................... B25H 1/0014 |
| | | | 414/427 |
| 2007/0059135 A1 | * | 3/2007 | Mizner ................ B60P 1/4442 |
| | | | 414/462 |
| 2008/0250984 A1 | * | 10/2008 | Panzarella ................ B60P 3/07 |
| | | | 108/44 |
| 2010/0191615 A1 | | 7/2010 | Thomas |
| 2019/0143872 A1 | | 5/2019 | Gil |
| 2022/0063908 A1 | | 3/2022 | Buel |

* cited by examiner

APPARATUS AND DEVICES FOR MOVING, TRANSPORTING, AND STORING PORCH BOTS

CROSS-REFERENCE TO RELATED APPLICATIONS

In compliance with 35 U.S.C. 102(b)(2)(C) and the requirements set forth in the Manual of Patent Examining Procedure (MPEP), this statement is to establish that the subject matter disclosed in the Provisional Application No. 63/198,686, PCT Application No. PCT/US21/70626, 371 application Ser. No. 17/595,985, PCT Application No. PCT/US22/74828, and PCT Application No. PCT/US24/12319 is not prior art to the claimed invention in the present application. This is because the disclosed subject matter and the claimed invention were, not later than the effective filing date of the claimed invention, owned by the same person or subject to an obligation of assignment to the same person.

I, Gregory D Carson, as the patent attorney of record for David M. Candelario, hereby declare that the subject matter disclosed in the above referenced applications and the claimed invention in the present application were, not later than the effective filing date of the claimed invention in the present application, owned by David M. Candelario.

BACKGROUND OF THE INVENTION

Technical Field

This invention relates generally to a system for the automated handling and transport of portable storage units, specifically referred to as "porch bots." These systems are designed to enhance the efficiency and precision of logistics operations, particularly in the loading, unloading, and transportation of goods within delivery vehicles such as truck trailers.

This invention relates more particularly to an apparatus/device for lifting, rotating, and precisely positioning porch bots both inside and outside of truck trailers. The invention comprises several key components, including a porch bot elevator, a railed fork bot, and a railed crane bot, each designed to work in conjunction with advanced control systems, navigation technologies, and safety mechanisms to ensure seamless and secure operation.

This invention relates generally to apparatuses and devices for automating the movement, positioning, and secure transport of modular storage units within delivery systems, such as truck trailers used for logistics and distribution. These systems are essential for modern logistics, where efficiency, precision, and automation are critical to meeting the demands of timely delivery and secure handling of goods.

This method also can be used with various automated delivery systems involving porch bots and transport vehicles, including applications in residential, commercial, and industrial deliveries. By integrating advanced navigation systems, obstacle detection, and geolocation data, these systems can operate autonomously or semi-autonomously to safely and efficiently manage the movement of storage units.

This invention relates more particularly to a railed fork bot and a railed crane bot apparatus designed to facilitate the precise lifting, rotating, and secure positioning of porch bots within truck trailers. These apparatuses are equipped with automated control systems for managing complex movements, as well as safety features such as anti-friction mechanisms, quick-release systems, and locking mechanisms to ensure that the storage units remain securely positioned during transport. The invention also incorporates advanced tracking and navigation technologies to optimize the efficiency and safety of the delivery process.

This invention relates generally to a product transport and storage apparatus in the form of automated bots designed to assist and complement human activity. These bots are engineered to take on tasks traditionally requiring manual labor, thereby making human activity less strenuous, more efficient, and significantly more productive. By automating key elements of the transport and storage process, these bots can reduce physical strain, save time, and enhance operational efficiency across various industries.

A primary field of use for this invention is urban and suburban food distribution, where the demand for timely, safe, and efficient delivery of products is particularly high. In this context, the bots can be employed to manage the loading, unloading, and precise positioning of food products within delivery vehicles, such as truck trailers. The automated nature of these bots allows for optimized delivery schedules, reduced manual handling, and improved accuracy in the transport of perishable goods.

These bots can be configured for a variety of tasks, including lifting, rotating, and securely positioning storage units, such as porch bots, within transportation vehicles. Their design integrates advanced control systems, navigation technologies, and safety mechanisms, ensuring that they can operate autonomously or semi-autonomously, effectively reducing the need for direct human intervention. This not only improves efficiency but also minimizes the risk of injury associated with heavy lifting and repetitive manual tasks.

Beyond food distribution, these bots have potential applications in other sectors that require the transport and storage of products, including residential deliveries, commercial logistics, and industrial supply chains. The adaptability of the bots allows them to handle a wide range of product types, from small consumer goods to larger, bulkier items, making them a versatile solution for modern logistics challenges.

By integrating state-of-the-art tracking, obstacle detection, and geolocation systems, these bots can navigate complex urban and suburban environments with ease, ensuring safe and efficient delivery of products. The combination of precision, automation, and adaptability makes this invention a game-changer for industries that depend on the smooth, reliable movement of goods.

Background Art

The related art known to the applicant encompasses various systems and devices used in product transport and storage, particularly within the logistics and delivery sectors. Traditional systems include manual handling equipment such as dollies, carts, and pallet jacks, as well as mechanized solutions like forklifts, cranes, and conveyor belts. These tools have been widely adopted across industries, including food distribution, warehouse operations, and industrial supply chains. However, the reliance on these systems has presented several challenges, especially in the context of urban and suburban delivery environments.

One major problem with the related art is the dependency on manual labor for loading, unloading, and positioning goods. In food distribution, for example, delivery personnel often need to physically lift and transport heavy or awkwardly shaped items from vehicles to delivery points. This process is not only labor-intensive but also prone to human error, which can result in damaged goods, missed deliveries, and inefficiencies in the distribution process. Additionally, manual handling introduces safety concerns, as workers are at risk of injury from repetitive lifting and moving of heavy objects.

In response to these challenges, mechanized systems such as forklifts and cranes have been developed to assist with the heavy lifting of products within storage and transport environments. However, these systems often require skilled operators, significant space, and infrastructure to operate effectively. Furthermore, their design is generally not optimized for the precision and automation needed in tight delivery spaces, such as those encountered in urban and suburban food distribution.

Another known related art is the use of automated guided vehicles (AGVs) and conveyor systems in warehouses and industrial settings. These systems offer some level of automation, reducing the need for direct human involvement in moving goods. However, they are generally confined to controlled environments with predefined paths and limited flexibility. AGVs and similar systems struggle to adapt to dynamic, real-world conditions, such as varying delivery locations, complex urban navigation, and the need for real-time decision-making in response to obstacles or changes in delivery schedules.

Furthermore, current automated systems are often disconnected from broader logistics management technologies, such as GPS (Global Positioning System) tracking, geolocation data integration, and obstacle detection systems. This lack of integration limits the ability of these systems to optimize delivery routes, avoid hazards, and ensure the safe and efficient delivery of goods in environments that require constant adaptability, such as urban and suburban food distribution.

A significant problem in the prior art is the inability to seamlessly integrate automation with the flexibility required for handling a wide range of products, especially in delivery systems that operate in both controlled and uncontrolled environments. This gap has led to inefficiencies in product transport, particularly in industries that require delicate handling of perishable items, precise positioning within tight spaces, and reliable, timely deliveries to multiple locations.

The applicant's invention solves these problems by providing a comprehensive, automated system that integrates lifting, rotating, and positioning apparatuses for product transport and storage. The invention's innovative use of porch bots, railed fork bots, and railed crane bots addresses the limitations of manual and mechanized systems by enabling autonomous or semi-autonomous operation within delivery vehicles and complex urban environments. These bots are equipped with advanced control systems, navigation technologies, and safety mechanisms that allow them to operate precisely and efficiently, reducing the need for manual labor and enhancing overall productivity and safety.

While the related art offers various solutions for product transport and storage, the applicant's invention introduces novel mechanisms and integrated technologies that solve the existing problems of manual handling, limited automation, and the lack of adaptability in urban and suburban delivery systems.

In light of the foregoing prior art, there is a need for a fully integrated, automated transport and storage apparatus to better address the inefficiencies and limitations of current manual and mechanized systems. Specifically, there is a need for a system that can seamlessly manage the precise loading, unloading, and positioning of products in dynamic environments, such as urban and suburban delivery routes, while reducing the physical strain on human workers, minimizing human error, and ensuring the safe, efficient, and timely movement of goods. This system should also incorporate advanced navigation, tracking, and obstacle detection technologies to operate autonomously or semi-autonomously in real-world conditions.

SUMMARY OF THE INVENTION

The present invention relates to an automated transport and storage system that addresses key challenges in the fields of logistics and delivery, particularly within urban and suburban food distribution. The invention introduces a novel system that integrates porch bots, porch bot elevators, railed fork bots, and railed crane bots to automate the processes of loading, unloading, and positioning products within delivery vehicles, such as truck trailers. These bots are designed to reduce the reliance on manual labor, enhance efficiency, and ensure the precise handling of goods, all while operating in dynamic, real-world environments.

One of the primary objects of the invention is to solve the problems associated with manual handling and mechanized systems that are either labor-intensive, prone to human error, or require significant space and infrastructure. The invention offers a more versatile and adaptable solution, capable of operating autonomously or semi-autonomously in confined and complex delivery environments, such as those found in urban and suburban areas. By incorporating advanced control systems, navigation technologies, and safety mechanisms, the invention ensures safe and efficient operation, reducing the physical strain on workers and minimizing the risk of damage to goods.

Another key objective of the invention is to integrate cutting-edge technologies, such as GPS tracking, geolocation data, and obstacle detection systems, to optimize the movement of goods within transport vehicles. These features allow the bots to navigate complex environments, avoid obstacles, and maintain precise positioning of products during transport. As a result, the invention significantly improves the efficiency and safety of the delivery process, particularly for perishable goods and other time-sensitive products.

The invention also addresses the limitations of current automated systems, which are often confined to controlled environments and lack the flexibility required for real-world delivery scenarios. By offering a comprehensive solution that integrates automation, precision, and adaptability, the invention provides a more effective and reliable approach to product transport and storage, solving many of the problems present in the prior art.

In summary, the present invention advances the state of the art by offering a fully automated system that enhances the efficiency, safety, and precision of product transport and storage, particularly in urban and suburban delivery environments.

According to one aspect of the present invention, there is a "Product Transport and Storage System" in the form of an automated bot apparatus for the purpose of facilitating the efficient, precise, and safe handling of products during transport and delivery. The system comprises various bots, including porch bots, railed fork bots, and railed crane bots, which work together to automate the processes of loading, unloading, and positioning goods within transport vehicles, such as truck trailers. These bots are specifically designed to operate in dynamic environments, such as urban and suburban delivery routes, where space constraints, time sensitivity, and complex navigation present unique challenges.

An advantage of the automated bot apparatus is its ability to significantly reduce the physical strain on human workers by automating tasks that would traditionally require manual labor, such as lifting and positioning heavy or bulky items. This reduces the risk of workplace injuries and enhances overall productivity by allowing for more efficient use of resources.

Additionally, another key advantage is the system's precision and adaptability. By integrating advanced control systems, GPS tracking, and obstacle detection technologies, the bots can navigate complex environments with minimal human intervention, ensuring that products are handled with care and delivered on time. This capability is especially critical in industries like food distribution, where the handling of perishable goods requires careful coordination and real-time responsiveness.

The invention also addresses the limitations of conventional mechanized systems, such as forklifts and cranes, which often require significant space, infrastructure, and skilled operators. By providing a more compact and flexible solution, the automated bot apparatus can operate efficiently in confined spaces and adapt to various delivery scenarios, making it a versatile tool for modern logistics.

The Product Transport and Storage System offers numerous advantages, including enhanced safety, efficiency, and adaptability, making it a valuable innovation for industries that rely on the timely and secure movement of goods.

According to a first aspect of the invention, there is a porch bot elevator for lifting and rotating a porch bot to position said porch bot inside and outside of a truck trailer, said porch bot elevator comprising: a column support; a trunnion rotatably connected to said column support in parallel; a platform base connected orthogonal to said trunnion; wherein said platform base is arranged to be rotated around said column support by turning said trunnion; and an automated control system to precisely manage lifting and rotating operations.

According to a second aspect of the invention, there is a porch bot elevator wherein said column support comprises at least one threaded eyelet through which said trunnion passes to rotatably connect to said column support, and said trunnion comprises a threaded exterior which meshes with said threaded eyelet to translate said platform base parallel to said column support by turning said trunnion, including an anti-friction mechanism for smooth operation.

According to a third aspect of the invention, there is a porch bot elevator wherein said column support has a longitudinal slot to access a longitudinal traversing mechanism in an interior of said column support, wherein at least one threaded eyelet is connected to said longitudinal traversing mechanism to translate said platform base parallel to said column support, and includes a locking mechanism to secure the position of the platform base.

According to a fourth aspect of the invention, there is a porch bot elevator further comprising a navigation and GPS system and a position streaming system enhanced in over/under layers with at least one of: a location tracking label selected from the group consisting of PLANET (Postal Alpha Numeric Encoding Technique) barcodes and cubic codes; an optical/video systems integration (ultraviolet, infrared, satellite imagery); a geolocation data integration; and an obstacle detection and avoidance system for safe operation.

According to a fifth aspect of the invention, there is a railed fork bot for lifting and positioning in a truck trailer with a porch bot comprising: a base end distal from a distal end; a plurality of tines of a fork to lift said porch bot wherein said fork extends from a carriage which slides along a rail arm from said base end to said distal end; said base end is configured to support said railed fork bot vertically from a truck trailer bed of said truck trailer; said distal end comprises a rail car interface to connect to a rail car on a roof of said truck trailer to stabilize said rail car as a column; and an automated control system for precise positioning and lifting.

According to a sixth aspect of the invention, there is a railed fork bot wherein said rail car interface is arranged to connect said distal end of said rail arm to a winch on said rail car to raise and lower said carriage along said rail arm, including a safety brake system.

According to a seventh aspect of the invention, there is a railed fork bot wherein said distal end comprises at least one threaded eyelet through which a trunnion passes to rotatably connect to said distal end to said porch bot, and wherein said trunnion comprises a threaded exterior which meshes with said threaded eyelet to connectively and operatively attach said distal end to said porch bot by turning said trunnion, including a quick-release mechanism.

According to an eighth aspect of the invention, there is a railed fork bot further comprising a navigation and GPS system and a position streaming system enhanced in over/under layers with at least one of: a location tracking label selected from the group consisting of PLANET barcodes and cubic codes; an optical/video systems integration (ultraviolet, infrared, satellite imagery); a geolocation data integration; and an obstacle detection and avoidance system for safe navigation.

According to a ninth aspect of the invention, there is a railed fork bot for lifting and positioning in a truck trailer with a porch bot wherein said railed fork bot comprises: a base end distal from a distal end; tines of a fork to lift said porch bot wherein said fork extends from a carriage which slides along a rail arm from said base end to said distal end; said base end is configured to support said railed fork bot vertically from a floor of said truck trailer; said distal end comprises a rail car interface to connect to a rail car on a roof of said truck trailer to stabilize said rail car as a column; and an automated control system for precise positioning and lifting.

According to a tenth aspect of the invention, there is a railed fork bot wherein said distal end comprises at least one threaded eyelet through which a trunnion passes to rotatably connect to said distal end to said porch bot, and wherein said trunnion comprises a threaded exterior which meshes with said threaded eyelet to connectively and operatively attach said distal end to said porch bot by turning said trunnion, including a quick-release mechanism.

According to an eleventh aspect of the invention, there is a railed fork bot wherein said rail car interface is arranged to connect said distal end of said rail arm to a winch on said rail car to raise and lower said carriage along said rail arm, including a safety brake system.

According to a twelfth aspect of the invention, there is a railed fork bot comprising teeth arrayed along a longitudinal length of said rail arm and said carriage comprises a ratchet which operates on said teeth to raise and lower said carriage along said rail arm, including an automated locking system.

According to a thirteenth aspect of the invention, there is a railed fork bot comprising a wheel on said base end of said rail arm to roll said rail arm along said floor, featuring an anti-vibration mechanism for smooth movement.

According to a fourteenth aspect of the invention, there is a railed fork bot further comprising a navigation and GPS system and a position streaming system enhanced in over/ under layers with at least one of: a location tracking label selected from the group consisting of PLANET barcodes and cubic codes; an optical/video systems integration (ultraviolet, infrared, satellite imagery); a geolocation data integration; and an obstacle detection and avoidance system for safe navigation.

According to a fifteenth aspect of the invention, there is a railed crane bot apparatus for lifting and positioning in a truck trailer a porch bot and wherein: said railed crane bot apparatus further comprises a roof rail to be connected to a roof of said truck trailer longitudinally intermediate a front wall and an opposite rear door of said truck trailer; a rail car which runs in a longitudinal direction along said roof rail; wherein suspended from said rail car is a winch having a cord with a free end with a hook to lift and position said porch bot; and said automated control system for precise lifting and positioning.

According to a sixteenth aspect of the invention, there is a railed crane bot apparatus comprising an extension arm which extends in a direction orthogonal to said longitudinal direction of said roof rail, wherein said hook hangs from said cord which hangs over a distal end of said extension arm, featuring an automated extension and retraction mechanism.

According to a seventeenth aspect of the invention, there is a railed crane bot apparatus wherein said winch is connected to said rail car by an axle around which an extension arm rotates when urged, including a rotation lock mechanism for secure positioning.

According to an eighteenth aspect of the invention, there is a railed crane bot apparatus further comprising a navigation and GPS system and a position streaming system enhanced in over/under layers with at least one of: a location tracking label selected from the group consisting of PLANET barcodes and cubic codes; an optical/video systems integration (ultraviolet, infrared, satellite imagery); a geolocation data integration; and an obstacle detection and avoidance system for safe operation.

According to a nineteenth aspect of the invention, there is a railed crane bot apparatus wherein said free end comprises at least one threaded eyelet through which a trunnion passes to rotatably connect to said free end to said porch bot, and wherein said trunnion comprises a threaded exterior which meshes with said threaded eyelet to connectively and operatively attach said free end to said porch bot by turning said trunnion, including a quick-release mechanism.

The Product Transport and Storage System offers several distinct advantages that address the limitations of current product handling and delivery methods, particularly in urban and suburban environments:

Automation and Efficiency: By automating the processes of loading, unloading, and positioning products within transport vehicles, the system reduces reliance on manual labor, which significantly enhances operational efficiency. This leads to faster delivery times, reduced labor costs, and minimized human error, which are critical in high-demand industries such as food distribution.

Safety and Ergonomics: The system's automated bots, including the porch bots, railed fork bots, and railed crane bots, are designed to handle tasks that would otherwise require strenuous manual effort. This reduces the risk of workplace injuries associated with lifting, carrying, and maneuvering heavy or awkwardly shaped items. As a result, worker safety is greatly improved, and physical strain is minimized.

Precision and Adaptability: Equipped with advanced control systems, GPS tracking, and obstacle detection technologies, the bots are capable of navigating complex environments with high precision. This adaptability allows the system to operate effectively in tight or confined spaces, such as urban delivery routes, where conventional mechanized systems may struggle. This precision is especially valuable for handling perishable or fragile goods that require careful placement and timing.

Versatility: The system is not limited to a single application but can be adapted for a wide range of industries and environments. Whether in residential deliveries, commercial logistics, or industrial supply chains, the bots can handle diverse product types and delivery scenarios. This versatility makes the system a valuable tool across multiple sectors.

Reduced Infrastructure Requirements: Unlike traditional mechanized systems like forklifts or cranes, which require significant space and infrastructure to operate, the automated bots are designed to be compact and flexible. This allows them to operate efficiently in confined spaces without the need for extensive modifications to the delivery environment. The system's ability to integrate seamlessly into existing logistics operations further reduces overhead and setup costs.

Real-Time Responsiveness: With integrated navigation and tracking technologies, the system can make real-time adjustments based on environmental conditions, traffic, and delivery schedules. This responsiveness ensures that products are delivered on time and in optimal condition, reducing the risk of delays, spoilage, or damage, which is particularly important in industries like food distribution.

In conclusion, the Product Transport and Storage System represents a significant advancement in logistics technology by offering a highly automated, safe, and adaptable solution to the challenges of modern product handling and delivery. These advantages position the invention as a valuable asset for industries seeking to improve efficiency, reduce costs, and enhance the overall safety and precision of their operations.

The invention will now be described, by way of example only, with reference to the accompanying figures in which:

DETAILED DESCRIPTION OF THE INVENTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Index of Labelled Features in Figures. Features are listed in numeric order by Figure in numeric order.

Figure 1:
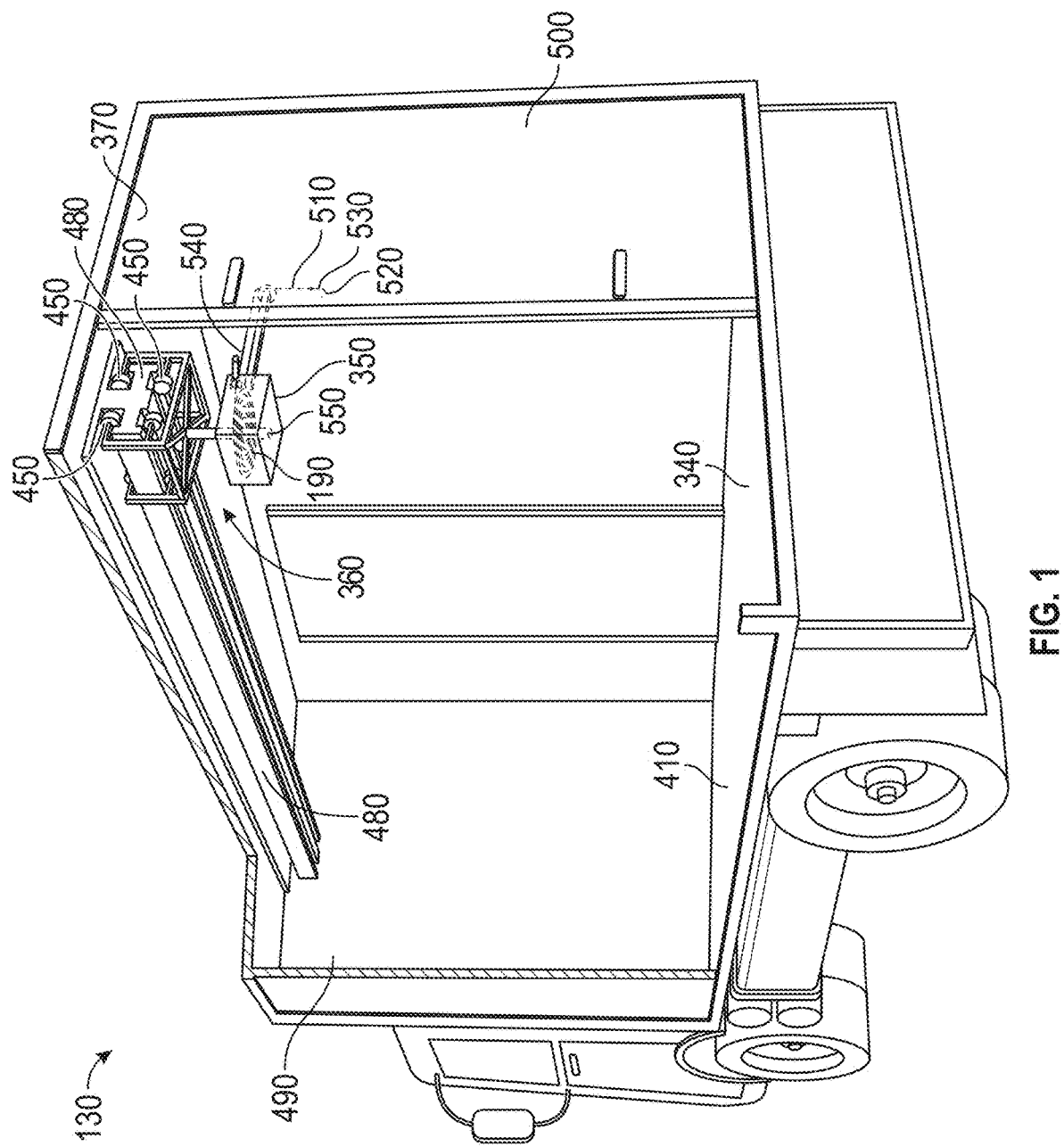
FIG. 1 is a cutaway view into an interior of a truck trailer comprising a railed crane bot for on a roof of the trailer according to the invention.
Figure 2:
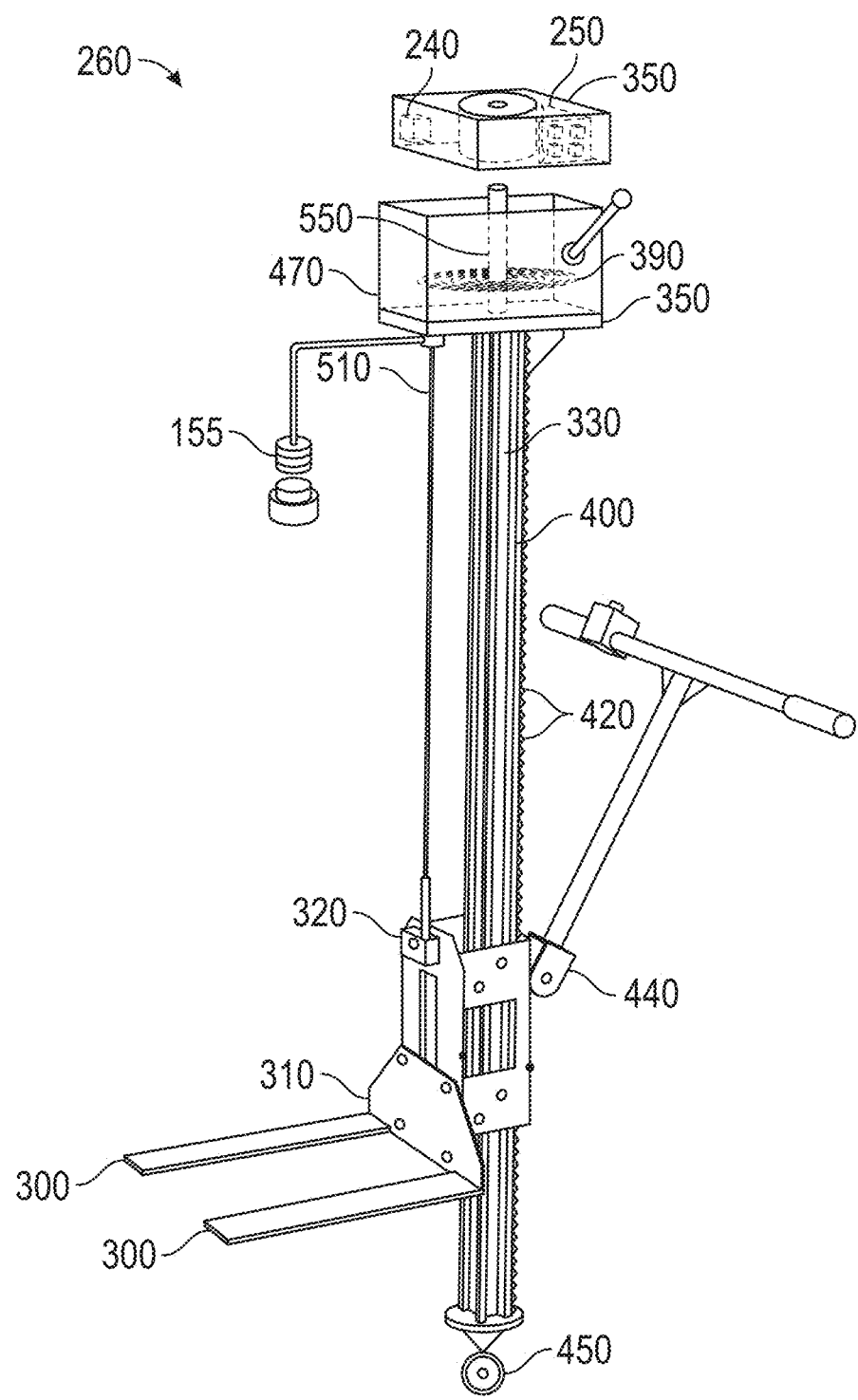
FIG. 2 is a perspective view of a railed fork bot according to the invention.
Figure 3:
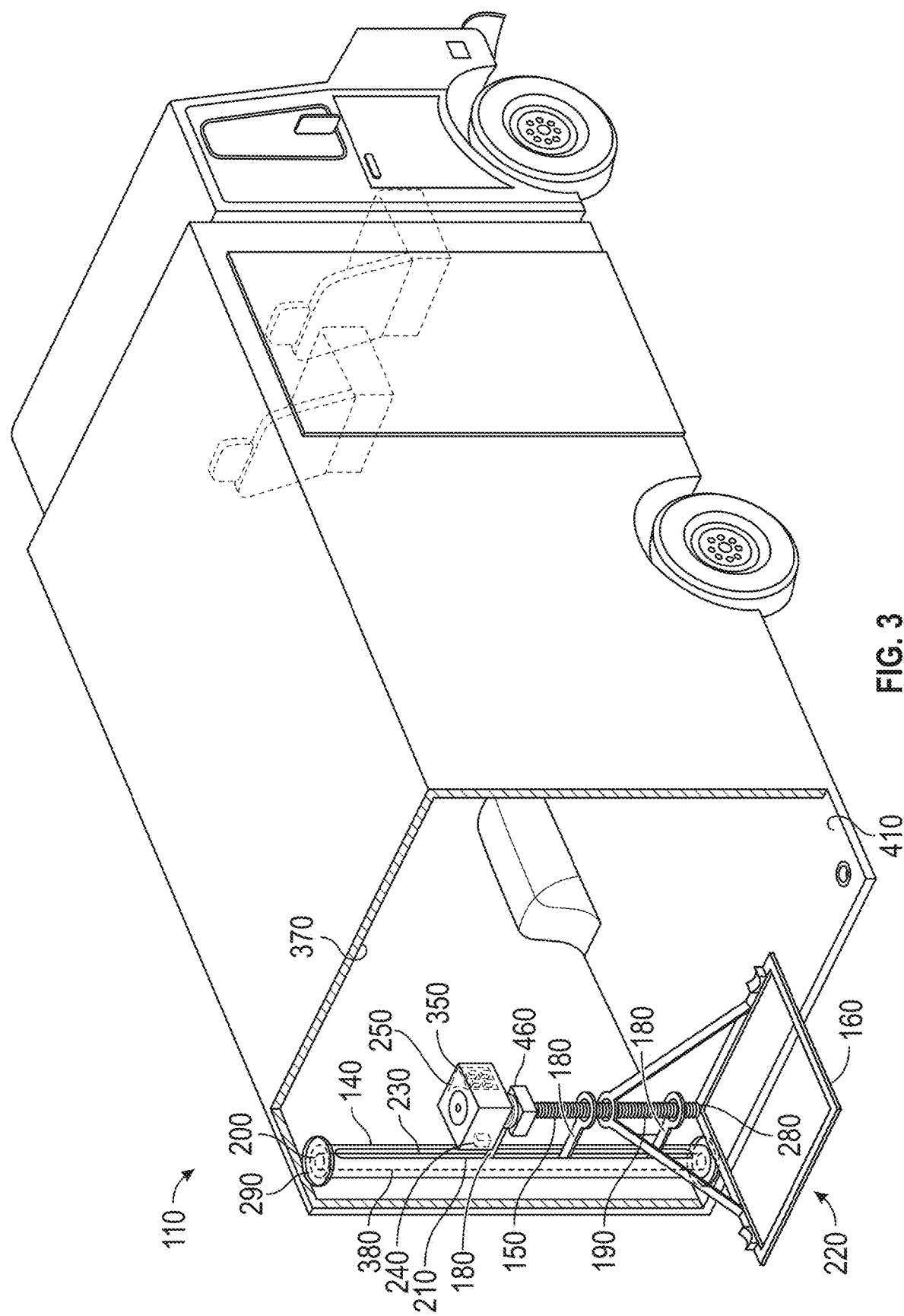
FIG. 3 is a perspective view into a rear opening of a truck trailer comprising a porch bot elevator proximate the rear opening according to the invention.
Figure 4:
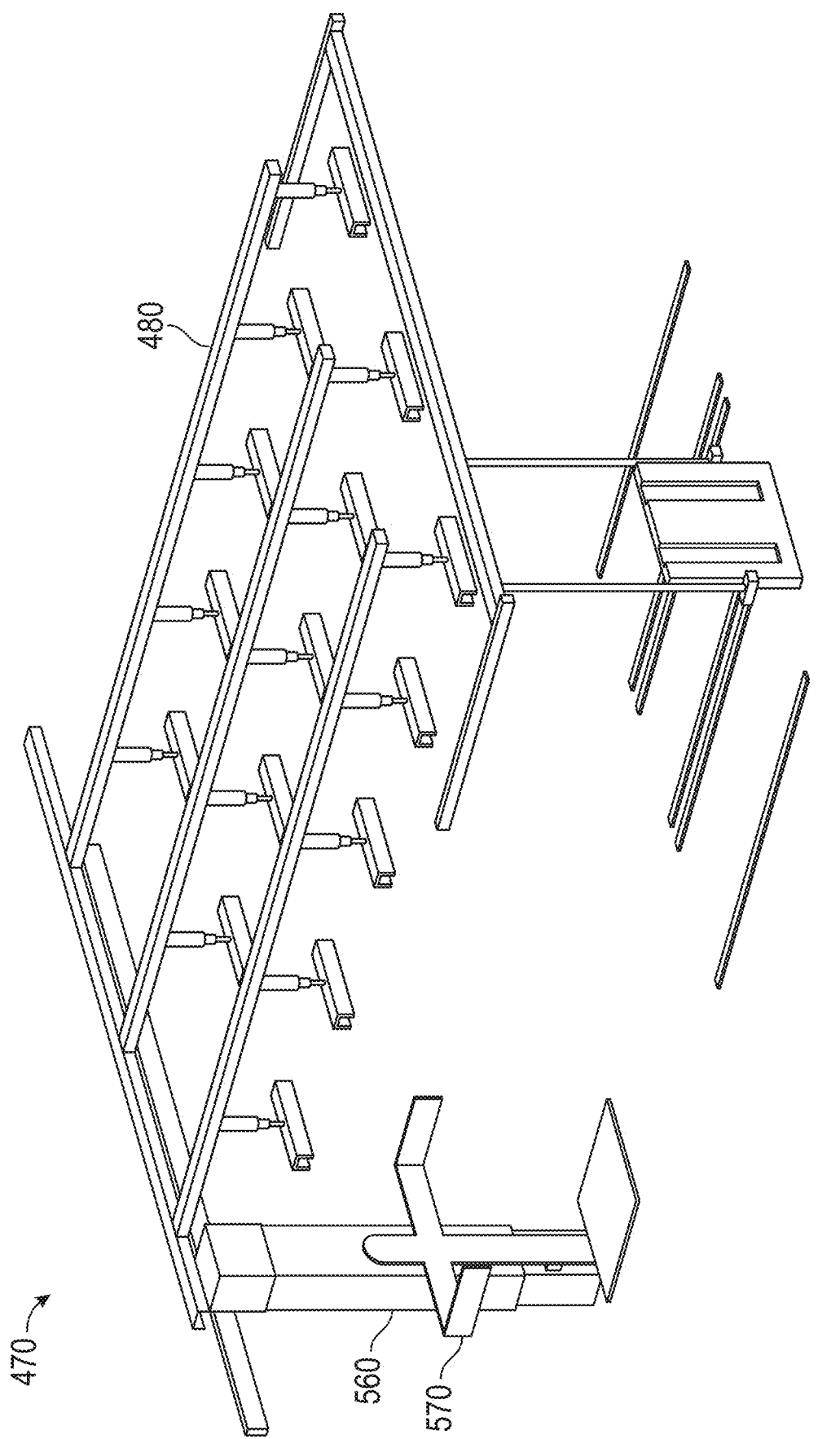
FIG. 4 is a perspective view of a railed crane bot separate from the truck trailer and without porch bots according to the invention.
Figure 5:
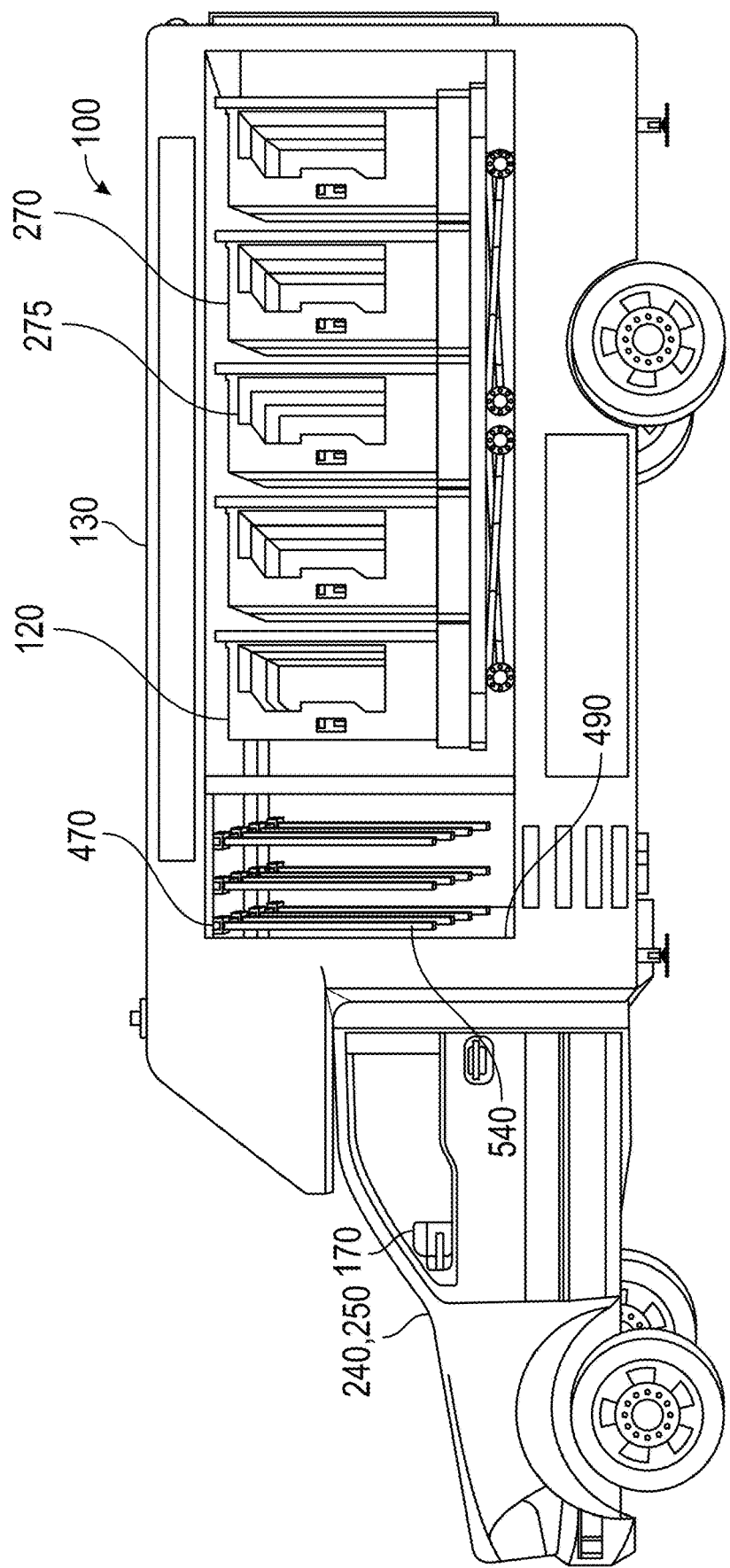
FIG. 5 is a side view of the truck trailer with the side open to show the porch bots and railed crane bots inside according to the invention.
Figure 6:
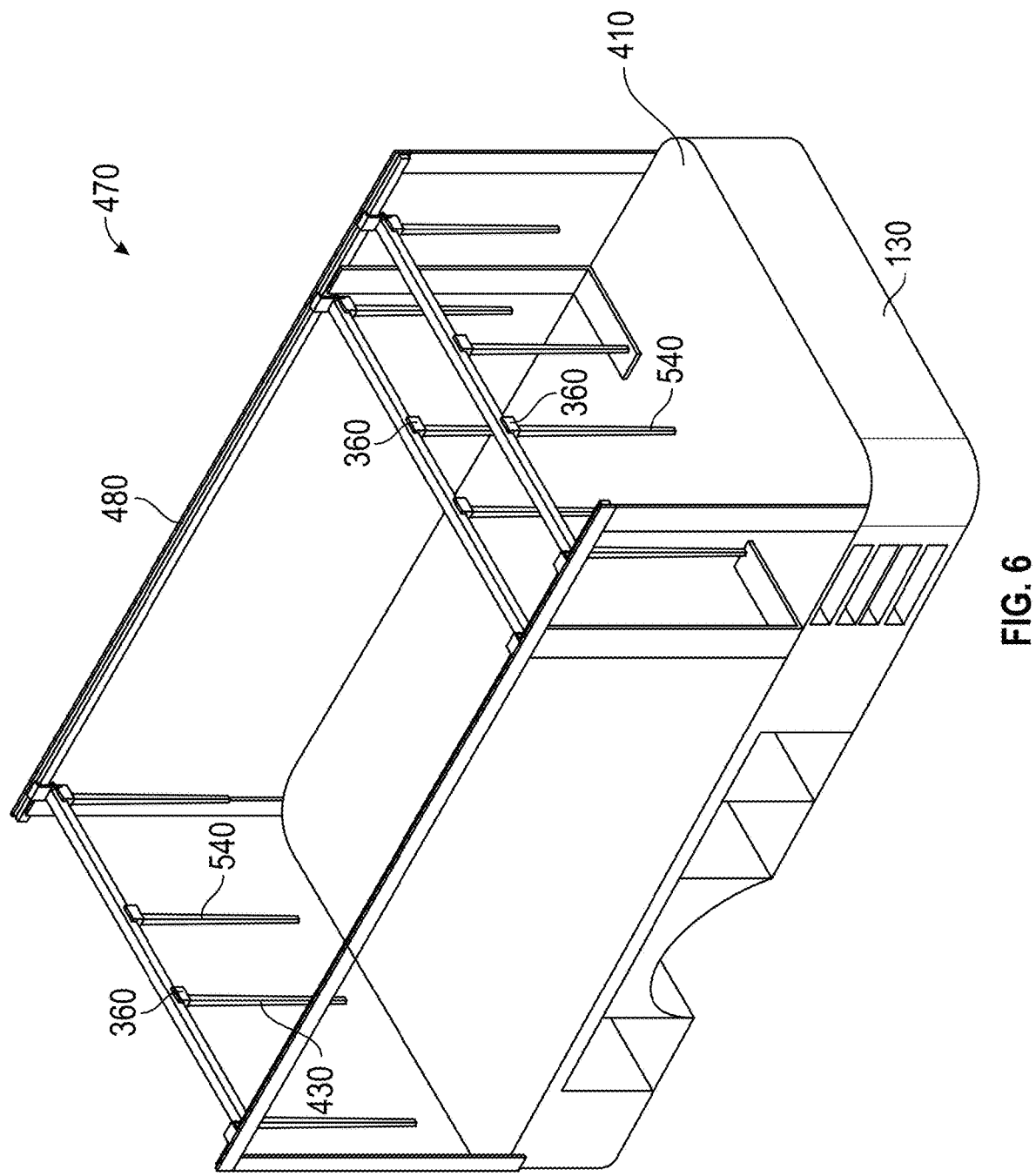
FIG. 6 is a perspective view of a railed crane bot in/on the truck trailer and without porch bots according to the invention.
Figure 7:
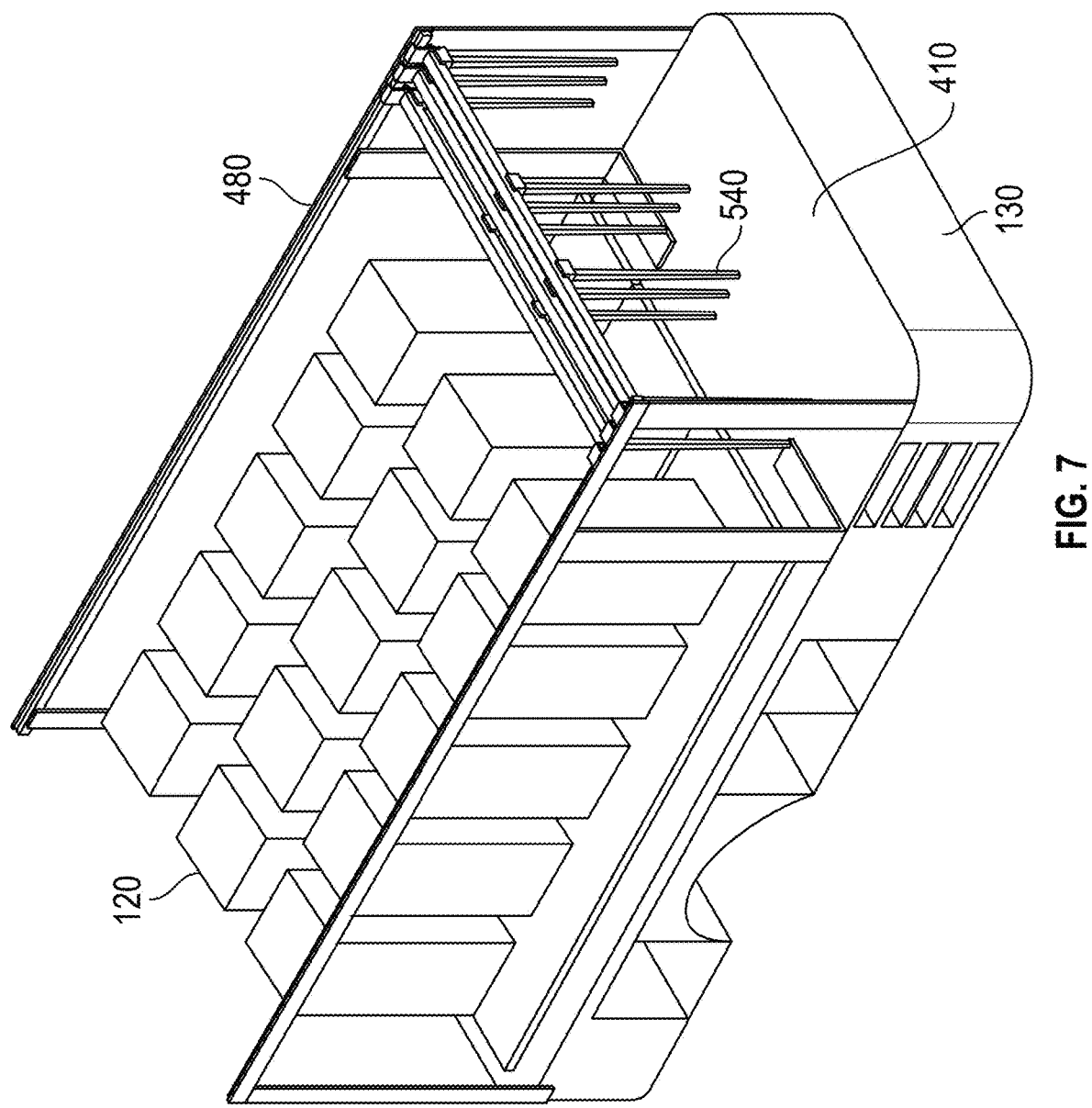
FIG. 7 is a perspective view of a railed crane bot in/on the truck trailer with porch bots loaded inside according to the invention.
Figure 8:
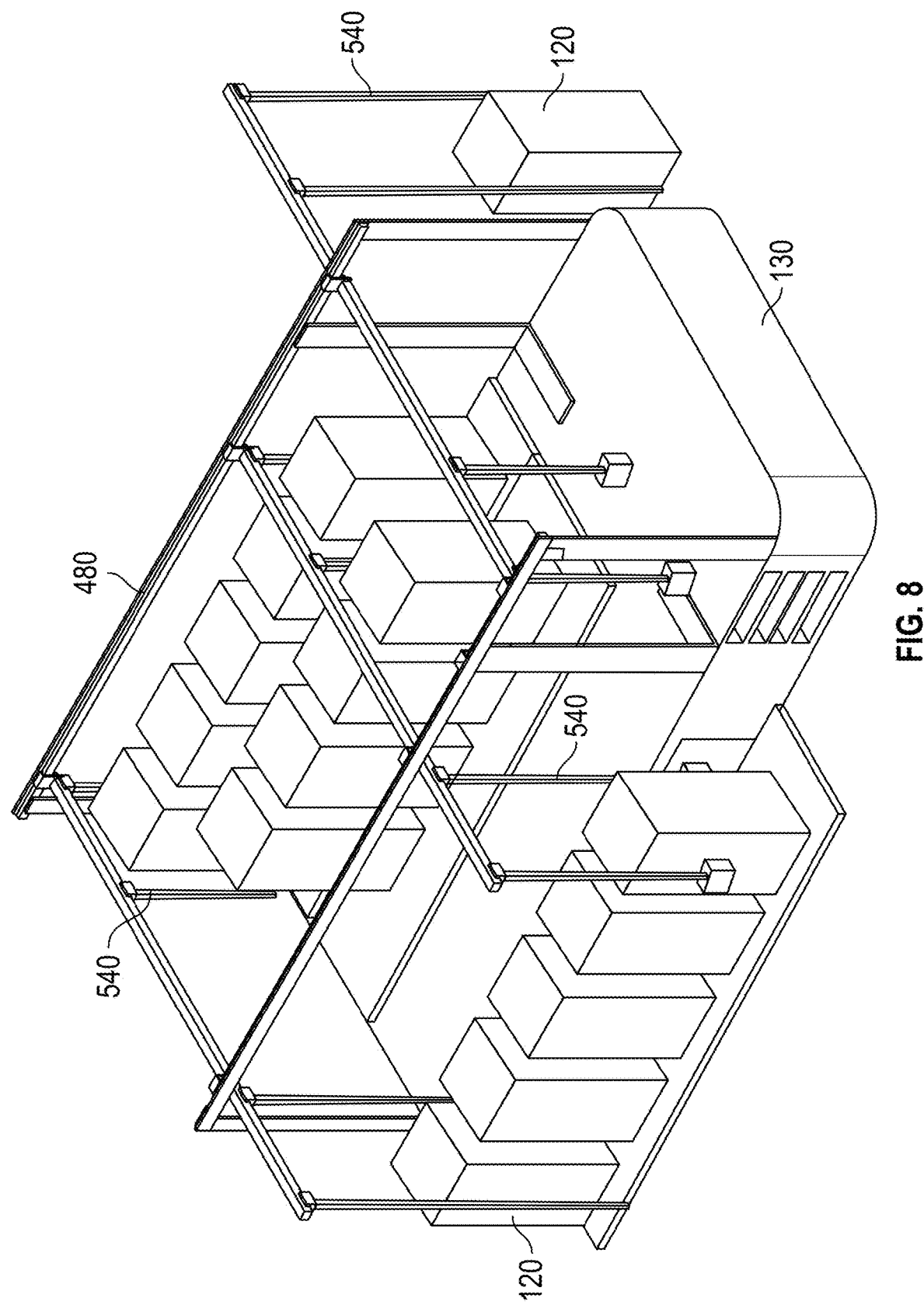
FIG. 8 is a perspective view of a railed crane bot in/on the truck trailer with porch bots being loaded and/or unloaded according to the invention.

Referring to the Figures, there is shown in FIGS. 1, 2, 3, and 4 the following features:

Element 100 which is are devices for moving, transporting, and storing porch bots.
Element 110 which is a porch bot elevator.
Element 120 which is a porch bot.
Element 130 which is a truck trailer.
Element 140 which is a column support.
Element 150 which is a trunnion.
Element 160 which is a platform base.
Element 170 which is an automated control system.
Element 180 which is a threaded eyelet.
Element 190 which is a threaded exterior.
Element 200 which is an anti-friction mechanism.
Element 210 which is a longitudinal slot.
Element 220 which is a longitudinal traversing mechanism.
Element 230 which is an interior of the column support.
Element 240 which is a navigation and GPS system.
Element 250 which is a position streaming system.
Element 260 which is a railed fork bot.
Element 270 which is a storage shell.
Element 275 which is a shelved interior.
Element 280 which is a base end.
Element 290 which is a distal end.
Element 300 which is a tine.
Element 310 which is a fork.
Element 320 which is a carriage.
Element 330 which is a rail arm.
Element 340 which is a truck trailer bed.
Element 350 which is a rail car interface.
Element 360 which is a rail car.
Element 370 which is a roof.
Element 380 which is a column.
Element 390 which is a winch.
Element 400 which is a safety brake system.
Element 410 which is a floor of the truck trailer.
Element 420 which is a tooth.
Element 430 which is a longitudinal length of the rail arm.
Element 440 which is a ratchet.
Element 450 which is a wheel.
Element 460 which is an anti-vibration mechanism.
Element 470 which is a railed crane bot apparatus.
Element 480 which is a roof rail.
Element 490 which is a front wall.
Element 500 which is an opposite rear door.
Element 510 which is a cord.
Element 520 which is a free end of the cord.
Element 530 which is a hook.
Element 540 which is an extension arm.
Element 550 which is an axle.
Element 560 which is an automated extension and retraction mechanism.
Element 570 which is a rotation lock mechanism for secure positioning.

How to Make the Devices
Porch Bot Elevator:
  Components: The porch bot elevator consists of a column support, a trunnion for rotation, a platform base for carrying the porch bot, and an automated control system to manage operations. Additional components include a longitudinal traversing mechanism, threaded eyelets, anti-friction mechanisms, and optional GPS navigation systems.
Materials:
  Column Support and Trunnion: Use high-strength steel or aluminum alloys for the column support and trunnion, ensuring durability and the ability to handle heavy loads.
  Platform Base: A lightweight composite material, such as carbon fiber-reinforced polymers, is ideal for the platform base, balancing strength with weight efficiency.
  Anti-Friction Mechanisms: Utilize roller bearings or ball bearings to reduce friction, ensuring smooth and reliable movement.
  Sensors and Electronics: Incorporate high-precision sensors for position tracking, along with durable electronics for the control system.
Assembly:
  Trunnion and Column Support: Attach the trunnion to the column support using precision bearings and threaded eyelets. The trunnion should have a machined threaded exterior that meshes perfectly with the threaded eyelets, allowing for both rotational and translational movement along the column support.
  Platform Base Connection: Secure the platform base orthogonally to the trunnion, ensuring a strong connection that can withstand rotational forces. The connection must be stable yet allow for easy rotation around the column support axis.
  Automated Control System: Integrate the control system with actuators and sensors that manage the lifting, rotating, and translating functions. Ensure that the system includes real-time feedback mechanisms for precision control.
  Safety Mechanisms: Add a locking mechanism that engages when the platform base reaches its desired position, preventing unintended movement.

Railed Fork Bot:
  Components: The railed fork bot includes a storage shell, base end, distal end, rail arm, carriage, and tines, as well as an automated control system and optional navigation and obstacle detection systems. Key components like the winch system and safety brake system are critical for secure lifting.
Materials:
  Rail Arm and Carriage: Use lightweight yet strong materials such as aluminum alloys for the rail arm, with steel or reinforced composites for the carriage to support the lifting forces and ensure durability.
  Tines: The tines should be made from reinforced steel or high-strength alloys to bear the weight of the porch bot.
  Winch and Cables: High-tensile strength synthetic fibers, such as Kevlar or steel cables, are suitable for the winch system, ensuring safe lifting operations.
Assembly:
  Rail Arm and Tines: Attach the tines to the carriage, which slides along the length of the rail arm. The rail arm should be mounted between the base end (which rests on the trailer floor) and the distal end (which connects to the roof rail car).
  Winch System: Install the winch system at the distal end, connected to the rail car. This system allows for precise raising and lowering of the carriage along the rail arm, with the safety brake system ensuring secure operations.
  Automated Control System: Integrate the control system with GPS tracking and obstacle detection technologies. Position sensors along the rail arm to monitor and control the carriage's movement, ensuring precise and smooth operation.
  Safety Mechanisms: Include a quick-release mechanism on the tines to allow for fast detachment in case of an emergency, and ensure the safety brake system is operational at all times to prevent accidental drops.
Railed Crane Bot:
  Components: The railed crane bot apparatus includes a roof rail, rail car, winch, cord, hook, and an automated control system. Additional components include an extension arm and a rotation lock mechanism for secure positioning.
Materials:
  Roof Rail and Rail Car: Use lightweight, high-strength aluminum or steel for the roof rail and rail car, ensuring durability and the ability to carry substantial loads.
  Winch and Hook: The winch should be made of corrosion-resistant materials, and the hook should be constructed from high-strength steel to securely lift the porch bot.
  Cord: Utilize high-tensile synthetic fibers, such as Kevlar, for the cord to ensure strength and reliability under load.
Assembly:
  Roof Rail Installation: Mount the roof rail longitudinally along the inside of the truck trailer, ensuring it runs between the front and rear of the trailer. The rail car should be mounted on the roof rail, allowing it to move freely along the rail.
  Winch and Hook: Attach the winch to the rail car and connect the hook to the free end of the winch cord. The winch should have an automated retraction mechanism controlled by the system, with integrated sensors to monitor cord tension and load weight.
  Extension Arm: Attach the extension arm to the winch system, allowing for orthogonal movement relative to the roof rail. The arm should be extendable and retractable, controlled by the automated system for precise positioning.
  Automated Control System: Integrate the control system to manage the lifting, positioning, and movement of the rail car, winch, and extension arm. The system should include real-time navigation and obstacle detection to ensure safe and efficient operations.
How to Use the Devices
Porch Bot Elevator:
  Setup: Position the porch bot elevator adjacent to the truck trailer where it will be used. Ensure that the column support is securely anchored to prevent tipping or unintended movement. Connect the system to a power source and perform a system check to ensure all components are operational.
Operation:
  Lifting: Use the automated control system to lift the porch bot by rotating the trunnion, which engages with the threaded eyelets to move the platform base vertically along the column support. The control system will manage the speed and precision of the lift, using integrated sensors to monitor the position.
  Rotating and Positioning: Once the porch bot is at the desired height, rotate the platform base by turning the trunnion to position the porch bot inside or outside the trailer. The control system allows for fine adjustments to ensure precise positioning.
  Locking and Securing: Engage the locking mechanism once the porch bot is in position, ensuring that it remains securely in place. The GPS and position tracking features provide real-time feedback, confirming that the porch bot is accurately positioned.
Railed Fork Bot:
  Setup: The railed fork bot should be installed within the truck trailer, with the rail arm secured between the floor and the roof rail car. Perform a safety check to ensure the system is correctly installed and connected to the control system.
Operation:
  Loading and Lifting: Position the carriage and tines beneath the porch bot. Use the automated control system to lift the porch bot by raising the carriage along the rail arm. The winch system at the distal end will handle the lifting, while the safety brake system ensures secure operation.
  Moving and Positioning: Once the porch bot is lifted, move the carriage along the rail arm to the desired position within the trailer. The system's GPS tracking and sensors will guide the movement, ensuring that the porch bot is accurately placed.
  Lowering and Releasing: Use the winch to lower the porch bot into position. Once the porch bot is securely placed, disengage the tines using the quick-release mechanism, allowing the carriage to move back along the rail arm.
Railed Crane Bot:
  Setup: The railed crane bot should be installed on the roof of the truck trailer, with the rail car positioned to move along the roof rail. Perform system diagnostics to ensure that all components are functioning correctly.
Operation:
  Lifting and Transporting: Extend the winch cord and hook to attach to the porch bot. Use the automated control system to lift the porch bot by retracting the winch cord. The system will monitor the tension and load, ensuring a controlled lift.

Moving and Positioning: Move the rail car along the roof rail to transport the porch bot to the desired location within the trailer. The system allows for both longitudinal and orthogonal movement, using the extension arm and rotation lock mechanism to position the porch bot precisely.

Securing and Releasing: Once the porch bot is in position, use the rotation lock mechanism to secure it. The system's sensors will confirm that the porch bot is securely placed before releasing the hook.

Maintenance and Safety Protocols

Regular Maintenance:

Mechanical Components: Regularly inspect all moving parts, including trunnions, winches, and carriage systems, for wear and tear. Ensure that all bearings are properly lubricated and that anti-friction mechanisms are functioning smoothly.

Control Systems: Update software regularly to ensure that the control systems are running optimally. Check all sensors and actuators to ensure accurate operation.

Structural Integrity: Periodically check the structural components, such as the column support, rail arm, and roof rail, for signs of fatigue or damage. Replace any worn parts immediately to prevent operational failures.

Safety Protocols:

Pre-Operation Checks: Before each use, perform a system diagnostic to ensure that all safety mechanisms, such as the safety brake system and locking mechanisms, are operational.

Confirm that the control system is properly calibrated and that the navigation and obstacle detection systems are functioning.

Emergency Procedures: Train operators on how to engage the emergency shutdown system in case of a malfunction. Ensure that all operators are familiar with the system's quick-release mechanisms and safety locks.

Safe Operating Practices: Always engage the safety brake and locking mechanisms during operation to prevent unintended movement. Never operate the system with unbalanced loads or outside of its rated capacity.

According to a preferred embodiment of the invention, there is a porch bot elevator for lifting and rotating a porch bot to position said porch bot inside and outside of a truck trailer, said porch bot elevator comprising: a column support; a trunnion rotatably connected to said column support in parallel; a platform base connected orthogonal to said trunnion; wherein said platform base is arranged to be rotated around said column support by turning said trunnion; and an automated control system to precisely manage lifting and rotating operations.

According to an alternate embodiment of the invention, there is a porch bot elevator wherein said column support comprises at least one threaded eyelet through which said trunnion passes to rotatably connect to said column support, and said trunnion comprises a threaded exterior which meshes with said threaded eyelet to translate said platform base parallel to said column support by turning said trunnion, including an anti-friction mechanism for smooth operation.

According to an alternate embodiment of the invention, there is a porch bot elevator wherein said column support has a longitudinal slot to access a longitudinal traversing mechanism in an interior of said column support, wherein at least one threaded eyelet is connected to said longitudinal traversing mechanism to translate said platform base parallel to said column support, and includes a locking mechanism to secure the position of the platform base.

According to an alternate embodiment of the invention, there is a porch bot elevator further comprising a navigation and GPS system and a position streaming system enhanced in over/under layers with at least one of: a location tracking label (PLANET barcodes, cubic codes, etc); an optical/video systems integration (ultraviolet, infrared, satellite imagery); a geolocation data integration; and an obstacle detection and avoidance system for safe operation.

According to a preferred embodiment of the invention, there is a railed fork bot for lifting and positioning in a truck trailer with a porch bot comprising: a base end distal from a distal end; a plurality of tines of a fork to lift said porch bot wherein said fork extends from a carriage which slides along a rail arm from said base end to said distal end; said base end is configured to support said railed fork bot vertically from a truck trailer bed of said truck trailer; said distal end comprises a rail car interface to connect to a rail car on a roof of said truck trailer to stabilize said rail car as a column; and an automated control system for precise positioning and lifting.

According to an alternate embodiment of the invention, there is a railed fork bot wherein said rail car interface is arranged to connect said distal end of said rail arm to a winch on said rail car to raise and lower said carriage along said rail arm, including a safety brake system.

According to an alternate embodiment of the invention, there is a railed fork bot wherein said distal end comprises at least one threaded eyelet through which a trunnion passes to rotatably connect to said distal end to said porch bot, and wherein said trunnion comprises a threaded exterior which meshes with said threaded eyelet to connectively and operatively attach said distal end to said porch bot by turning said trunnion, including a quick-release mechanism.

According to an alternate embodiment of the invention, there is a railed fork bot further comprising a navigation and GPS system and a position streaming system enhanced in over/under layers with at least one of: a location tracking label (PLANET barcodes, cubic codes, etc); an optical/video systems integration (ultraviolet, infrared, satellite imagery); a geolocation data integration; and an obstacle detection and avoidance system for safe navigation.

According to a preferred embodiment of the invention, there is a railed fork bot for lifting and positioning in a truck trailer with a porch bot wherein said railed fork bot comprises: a base end distal from a distal end; tines of a fork to lift said porch bot wherein said fork extends from a carriage which slides along a rail arm from said base end to said distal end; said base end is configured to support said railed fork bot vertically from a floor of said truck trailer; said distal end comprises a rail car interface to connect to a rail car on a roof of said truck trailer to stabilize said rail car as a column; and an automated control system for precise positioning and lifting.

According to an alternate embodiment of the invention, there is a railed fork bot wherein said distal end comprises at least one threaded eyelet through which a trunnion passes to rotatably connect to said distal end to said porch bot, and wherein said trunnion comprises a threaded exterior which meshes with said threaded eyelet to connectively and operatively attach said distal end to said porch bot by turning said trunnion, including a quick-release mechanism.

According to an alternate embodiment of the invention, there is a railed fork bot comprising teeth arrayed along a longitudinal length of said rail arm and said carriage comprises a ratchet which operates on said teeth to raise and lower said carriage along said rail arm, including an automated locking system.

According to an alternate embodiment of the invention, there is a railed fork bot comprising a wheel on said base end of said rail arm to roll said rail arm along said floor, featuring an anti-vibration mechanism for smooth movement.

According to an alternate embodiment of the invention, there is a railed fork bot further comprising a navigation and GPS system and a position streaming system enhanced in over/under layers with at least one of: a location tracking label (PLANET barcodes, cubic codes, etc); an optical/video systems integration (ultraviolet, infrared, satellite imagery); a geolocation data integration; and an obstacle detection and avoidance system for safe navigation.

According to an alternate embodiment of the invention, there is a railed crane bot apparatus for lifting and positioning in a truck trailer a porch bot and wherein: said railed crane bot apparatus further comprises a roof rail to be connected to a roof of said truck trailer longitudinally intermediate a front wall and an opposite rear door of said truck trailer; a rail car which runs in a longitudinal direction along said roof rail; wherein suspended from said rail car is a winch having a cord with a free end with a hook to lift and position said porch bot; and said automated control system for precise lifting and positioning.

According to an alternate embodiment of the invention, there is a railed crane bot apparatus comprising an extension arm which extends in a direction orthogonal to said longitudinal direction of said roof rail, wherein said hook hangs from said cord which hangs over a distal end of said extension arm, featuring an automated extension and retraction mechanism.

According to an alternate embodiment of the invention, there is a railed crane bot apparatus wherein said winch is connected to said rail car by an axle around which an extension arm rotates when urged, including a rotation lock mechanism for secure positioning.

According to an alternate embodiment of the invention, there is a railed crane bot apparatus further comprising a navigation and GPS system and a position streaming system enhanced in over/under layers with at least one of: a location tracking label (PLANET barcodes, cubic codes, etc); an optical/video systems integration (ultraviolet, infrared, satellite imagery); a geolocation data integration; and an obstacle detection and avoidance system for safe operation.

According to an alternate embodiment of the invention, there is a railed crane bot apparatus wherein said free end comprises at least one threaded eyelet through which a trunnion passes to rotatably connect to said free end to said porch bot, and wherein said trunnion comprises a threaded exterior which meshes with said threaded eyelet to connectively and operatively attach said free end to said porch bot by turning said trunnion, including a quick-release mechanism.

Advantages of the present invention include:

The Product Transport and Storage System introduces a groundbreaking approach to automated product handling and delivery, offering a range of advantages that significantly improve upon existing methods. These advantages address various challenges in the logistics, distribution, and delivery industries, particularly in urban and suburban settings. The following provides an in-depth look at the key benefits:

Enhanced Automation and Operational Efficiency: The system automates traditionally manual tasks, such as loading, unloading, and precise positioning of products within transport vehicles. By reducing reliance on human labor, the system increases throughput and minimizes delays. The bots can operate continuously, enabling 24/7 operations without the need for rest, breaks, or shifts. This is particularly beneficial for time-sensitive industries like food distribution, where speed is critical to ensure freshness and customer satisfaction. The system also reduces the need for human oversight, as the bots can navigate, position, and move products autonomously or semi-autonomously. This automation leads to fewer mistakes, reduced product damage, and improved overall efficiency in the delivery process.

Significant Improvements in Safety and Worker Ergonomics: The automation of heavy lifting, rotating, and positioning tasks reduces the physical strain on workers, minimizing the risk of injuries related to repetitive stress, lifting accidents, or mishandling of heavy objects. By removing the need for workers to perform these strenuous activities, the system contributes to a safer and healthier working environment, reducing the likelihood of costly workplace injuries and associated downtime. In industries where the workforce is often engaged in repetitive and physically demanding tasks, the adoption of this system allows workers to focus on higher-value tasks that require decision-making, oversight, and customer interaction, further enhancing productivity and job satisfaction.

Precision and Adaptability for Complex Environments: The system is designed to operate with precision in a variety of environments, including confined urban and suburban spaces. The bots are equipped with advanced sensors, GPS tracking, and obstacle detection systems, allowing them to navigate complex delivery routes, avoid obstacles, and accurately position products. This is especially important for industries that require precise handling of delicate or perishable goods, such as food distribution, pharmaceuticals, or electronics. The adaptability of the system allows it to handle a wide range of products and delivery scenarios. Whether the environment involves narrow alleyways, crowded streets, or multi-level parking structures, the bots are capable of adjusting their operations to ensure safe and efficient delivery. This adaptability is a significant improvement over traditional mechanized systems, which often struggle to perform in non-standardized environments.

Versatility Across Multiple Industries: While the system is particularly well-suited for urban and suburban food distribution, its versatility makes it applicable across various industries. The system can be adapted for residential delivery services, commercial logistics, warehousing operations, and even industrial supply chains. This multi-industry applicability enhances the value of the system as a universal solution for modern logistics challenges. The system's ability to handle products of varying sizes, weights, and fragility levels makes it a flexible tool for companies with diverse product lines. Whether delivering small consumer goods, bulky furniture, or sensitive electronics, the system can be customized to meet specific operational needs.

Reduced Infrastructure and Space Requirements: Traditional mechanized systems, such as forklifts and cranes, often require large amounts of space and significant infrastructure investment to function effectively. The automated bots in this system are designed to be compact and flexible, allowing them to operate in confined spaces without the need for extensive modifications to the environment. This reduction in infrastructure requirements not only saves on setup costs but also makes the system more accessible for smaller businesses or operations with limited space. The system's ability to integrate seamlessly into existing logistics workflows further reduces the need for expensive infrastructure upgrades, making it an attractive option for companies looking to modernize their operations without significant capital expenditure.

Real-Time Responsiveness and Dynamic Adaptation: One of the key advantages of the system is its ability to respond in real-time to changing conditions. By integrating GPS tracking, geolocation data, and obstacle detection systems, the bots can dynamically adjust their routes and operations based on environmental factors, such as traffic, weather, or changes in delivery schedules. This real-time responsiveness ensures that deliveries are made on time and that products are handled with care, even in unpredictable situations. The system's responsiveness also allows for last-minute changes to delivery instructions, such as rerouting or reprioritizing deliveries based on customer demands or logistical constraints. This flexibility is crucial in industries where timely delivery is essential to maintaining customer satisfaction and operational efficiency.

Sustainability and Energy Efficiency: In addition to its operational benefits, the system contributes to sustainability by reducing the energy consumption associated with manual labor and traditional mechanized equipment. The bots are designed to operate efficiently, with minimal energy usage compared to larger, fuel-powered machinery like forklifts and cranes. This not only lowers operational costs but also reduces the carbon footprint of the delivery process. The system's ability to optimize delivery routes and minimize unnecessary movement further contributes to energy efficiency, making it a more environmentally friendly option for companies looking to reduce their impact on the environment.

The Product Transport and Storage System provides a comprehensive solution to many of the challenges faced by modern logistics and delivery operations. Through automation, precision, adaptability, and real-time responsiveness, the system offers significant improvements in efficiency, safety, and versatility, making it an indispensable tool for industries that rely on the timely and accurate movement of goods. Additionally, its sustainability benefits and reduced infrastructure requirements make it a forward-thinking option for companies aiming to future-proof their operations while minimizing their environmental impact.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. A porch bot elevator for lifting and rotating a porch bot to position said porch bot inside and outside of a truck trailer, said porch bot elevator comprising:
   a column support;
   a trunnion rotatably connected to said column support in parallel;
   a platform base connected orthogonal to said trunnion;
   wherein said platform base is arranged to be rotated around said column support by turning said trunnion; and
   an automated control system to precisely manage lifting and rotating operations.

2. The porch bot elevator according to claim 1 wherein said column support comprises at least one threaded eyelet through which said trunnion passes to rotatably connect to said column support, and said trunnion comprises a threaded exterior which meshes with said threaded eyelet to translate said platform base parallel to said column support by turning said trunnion, including an anti-friction mechanism for smooth operation.

3. The porch bot elevator according to claim 1 wherein said column support has a longitudinal slot to access a longitudinal traversing mechanism in an interior of said column support, wherein at least one threaded eyelet is connected to said longitudinal traversing mechanism to translate said platform base parallel to said column support, and includes a locking mechanism to secure a position of the platform base.

4. The porch bot elevator according to claim 1 further comprising a navigation and GPS system and a position streaming system enhanced in over/under layers with at least one of:
   a location tracking label selected from the group consisting of PLANET (Postal Alpha Numeric Encoding Technique) barcodes and cubic codes;
   an optical/video systems integration comprising one or more of ultraviolet, infrared, and satellite imagery;
   a geolocation data integration; and
   an obstacle detection and avoidance system for safe operation.

5. A railed fork bot for lifting and positioning a porch bot in a truck trailer comprising:
   a base end distal from a distal end;
   a plurality of tines of a fork to lift said porch bot wherein said fork extends from a carriage which slides along a rail arm from said base end to said distal end;
   said base end is configured to support said railed fork bot vertically from a truck trailer bed of said truck trailer;
   said distal end comprises a rail car interface to connect to a rail car on a roof of said truck trailer to stabilize said rail car as a column; and
   an automated control system for precise positioning and lifting.

6. The railed fork bot according to claim 5 wherein said rail car interface is arranged to connect said distal end of said rail arm to a winch on said rail car to raise and lower said carriage along said rail arm, including a safety brake system.

7. The railed fork bot according to claim 5 wherein said distal end comprises at least one threaded eyelet through which a trunnion passes to rotatably connect to said distal end to said porch bot, and wherein said trunnion comprises a threaded exterior which meshes with said threaded eyelet to connectively and operatively attach said distal end to said porch bot by turning said trunnion, including a quick-release mechanism.

8. The railed fork bot according to claim 5 further comprising a navigation and GPS system and a position streaming system enhanced in over/under layers with at least one of:

a location tracking label selected from the group consisting of PLANET (Postal Alpha Numeric Encoding Technique) barcodes and cubic codes;
an optical/video systems integration comprising one or more of ultraviolet, infrared, and satellite imagery;
a geolocation data integration; and
an obstacle detection and avoidance system for safe navigation.

9. A railed fork bot for lifting and positioning a porch bot in a truck trailer wherein said railed fork bot comprises:
a base end distal from a distal end;
tines of a fork to lift said porch bot wherein said fork extends from a carriage which slides along a rail arm from said base end to said distal end;
said base end is configured to support said railed fork bot vertically from a floor of said truck trailer;
said distal end comprises a rail car interface to connect to a rail car on a roof of said truck trailer to stabilize said rail car as a column; and
an automated control system for precise positioning and lifting.

10. The railed fork bot according to claim 9 wherein said distal end comprises at least one threaded eyelet through which a trunnion passes to rotatably connect to said distal end to said porch bot, and wherein said trunnion comprises a threaded exterior which meshes with said threaded eyelet to connectively and operatively attach said distal end to said porch bot by turning said trunnion, including a quick-release mechanism.

11. The railed fork bot according to claim 9 wherein said rail car interface is arranged to connect said distal end of said rail arm to a winch on said rail car to raise and lower said carriage along said rail arm, including a safety brake system.

12. The railed fork bot according to claim 9 comprising teeth arrayed along a longitudinal length of said rail arm and said carriage comprises a ratchet which operates on said teeth to raise and lower said carriage along said rail arm, including an automated locking system.

13. The railed fork bot according to claim 9 comprising a wheel on said base end of said rail arm to roll said rail arm along said floor, featuring an anti-vibration mechanism for smooth movement.

14. The railed fork bot according to claim 9 further comprising a navigation and GPS system and a position streaming system enhanced in over/under layers with at least one of:
a location tracking label selected from the group consisting of PLANET (Postal Alpha Numeric Encoding Technique) barcodes and cubic codes;
an optical/video systems integration comprising one or more of ultraviolet, infrared, and satellite imagery;
a geolocation data integration; and
an obstacle detection and avoidance system for safe navigation.

15. A railed crane bot apparatus for lifting and positioning a porch bot in a truck trailer wherein:
said railed crane bot apparatus further comprises a roof rail to be connected to a roof of said truck trailer longitudinally intermediate a front wall and an opposite rear door of said truck trailer;
a rail car which runs in a longitudinal direction along said roof rail;
wherein suspended from said rail car is a winch having a cord with a free end with a hook to lift and position said porch bot; and
an automated control system for precise lifting and positioning.

16. The railed crane bot apparatus according to claim 15 comprising an extension arm which extends in a direction orthogonal to said longitudinal direction of said roof rail, wherein said hook hangs from said cord which hangs over a distal end of said extension arm, featuring an automated extension and retraction mechanism.

17. The railed crane bot apparatus according to claim 15 wherein said winch is connected to said rail car by an axle around which an extension arm rotates when urged, including a rotation lock mechanism for secure positioning.

18. The railed crane bot apparatus according to claim 15 further comprising a navigation and GPS system and a position streaming system enhanced in over/under layers with at least one of:
a location tracking label selected from the group consisting of PLANET (Postal Alpha Numeric Encoding Technique) barcodes and cubic codes;
an optical/video systems integration comprising one or more of ultraviolet, infrared, and satellite imagery;
a geolocation data integration; and
an obstacle detection and avoidance system for safe operation.

19. The railed crane bot apparatus according to claim 15 wherein said free end comprises at least one threaded eyelet through which a trunnion passes to rotatably connect to said free end to said porch bot, and wherein said trunnion comprises a threaded exterior which meshes with said threaded eyelet to connectively and operatively attach said free end to said porch bot by turning said trunnion, including a quick-release mechanism.

* * * * *